United States Patent
Lee et al.

(10) Patent No.: US 7,465,474 B2
(45) Date of Patent: Dec. 16, 2008

(54) METHOD OF APPLYING FLOCCULENT TO POLYOLEFINS AND AN ASSOCIATED FLOCCULENT-COVERED POLYOLEFIN STRUCTURE

(75) Inventors: Jae Woo Lee, Flower Mound, TX (US); Doug Williams, Franklin, TN (US)

(73) Assignee: Bao Sheng Corporation, Kyungki-Do (KR)

( * ) Notice: Subject to any disclaimer, the term of this patent is extended or adjusted under 35 U.S.C. 154(b) by 171 days.

(21) Appl. No.: 11/040,279

(22) Filed: Jan. 21, 2005

(65) Prior Publication Data

US 2005/0158464 A1  Jul. 21, 2005

Related U.S. Application Data

(60) Provisional application No. 60/515,680, filed on Jan. 20, 2004.

(51) Int. Cl.
*B05D 1/16* (2006.01)
(52) U.S. Cl. ......................... 427/206; 427/462
(58) Field of Classification Search ................... None
See application file for complete search history.

(56) References Cited

U.S. PATENT DOCUMENTS

| | | | |
|---|---|---|---|
| 427,444 A | 5/1890 | Smith | |
| 1,220,875 A | 3/1917 | Moore | |
| 2,956,547 A | 10/1960 | Hovey, Jr. | |
| 3,095,175 A | 6/1963 | Iketani | |
| 3,356,441 A | 12/1967 | Schwartzman | |
| 3,400,997 A | 9/1968 | Schwartzman | |
| 3,436,442 A * | 4/1969 | Saks | 264/438 |
| 3,685,786 A | 8/1972 | Woodson | |
| 4,002,182 A | 1/1977 | Michel | |
| 4,040,753 A | 8/1977 | Griffith | |
| 4,368,746 A | 1/1983 | Spatz | |
| 4,892,756 A * | 1/1990 | Warren et al. | 427/206 |
| 5,185,402 A * | 2/1993 | Fleming et al. | 525/130 |
| 5,904,433 A | 5/1999 | Kay | |
| 2004/0047674 A1 | 3/2004 | Geardino et al. | |
| 2005/0109365 A1* | 5/2005 | Dunton et al. | 132/320 |
| 2006/0137999 A1 | 6/2006 | Williams | |

FOREIGN PATENT DOCUMENTS

DE  34 14418  * 10/1985
JP  61-279542 A  * 12/1986

* cited by examiner

*Primary Examiner*—Frederick J Parker
(74) *Attorney, Agent, or Firm*—Bracewell & Giuliani LLP

(57) ABSTRACT

A method of covering a polyolefin surface with flocculent includes applying a polyolefin-bondable adhesive to at least a portion of a polyolefin surface located on a structure. An epoxy bond material is then applied to the portion of the structure. Then, a flocculent is applied to the portion of the structure. The polyolefin-bondable adhesive and the epoxy bond material can be applied by submerging the portion of polyolefin surface into each. An apparatus includes a structure having a polyolefin surface selected from a group consisting of polyethylene and polypropylene. A layer polyolefin-bondable adhesive overlies and abuttingly contacts a portion of the polyolefin surface of the structure. A layer of epoxy bond material overlies and abuttingly contacts the layer of polyolefin-bondable adhesive. A flocculent overlies and abuttingly contacts the layer of epoxy bond material.

8 Claims, 3 Drawing Sheets

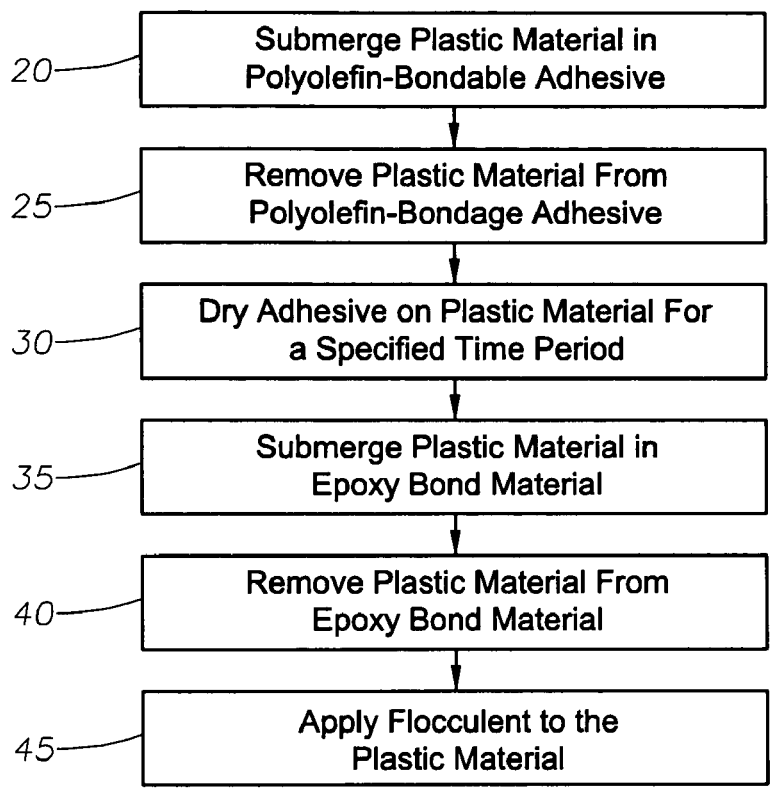
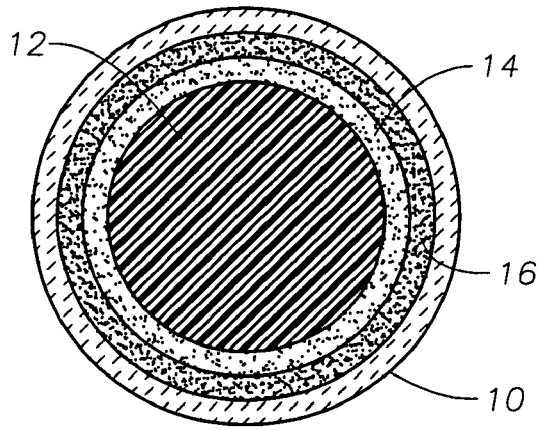
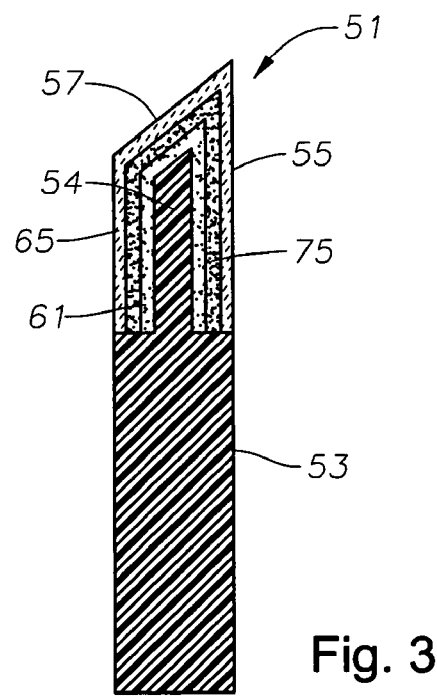

METHOD OF APPLYING FLOCCULENT TO POLYOLEFINS AND AN ASSOCIATED FLOCCULENT-COVERED POLYOLEFIN STRUCTURE

RELATED APPLICATIONS

This nonprovisional patent application claims the benefit of co-pending, provisional patent application U.S. Ser. No. 60/515,680, filed on Jan. 20, 2004, which is hereby incorporated by reference in its entirety.

BACKGROUND OF THE INVENTION

1. Field of the Invention

This invention relates in general to methods of applying flocculent to plastic materials. More specifically, this invention relates to methods of applying flocculent to polyolefins, such as polyethylene and polypropylene.

2. Background of the Invention

Flocculent has been used in various industries for many years. One such use is in the cosmetic brush industry. Flocculent has been used in cosmetic brushes to apply cosmetics for some time. Flocculent has a sponge-like consistency that allows makeup to be applied gently and precisely. Many applicators are made of plastic materials, such as polyethylene or polypropylene.

In the past, to applicant's knowledge, flocculent was not placed directly on tips formed of polypropylene or polyethylene because of the inability of an adhesive to readily adhere to a polypropylene or polyethylene tip. Consequently, in the prior art, the tip would typically be formed of a different material than the reservoir portion, and then attached to the reservoir portion.

To adhere flocculent to the plastic materials, various types of chemical compounds, such as thermoplastic polyester elastomers, are typically required to make the flocculent adhere to the chemical compound, which would then adhere to the plastic material. One major drawback to this type of process is that the chemical compounds are generally expensive, which significantly increases production costs of the makeup brushes containing flocculent. Many times the chemical compounds would also cause the flocculent to change colors, which is not aesthetically pleasing.

Another use of flocculent has been as a liner for containers, such as jewelry boxes. In this use, flocculent is typically applied to a fabric that is then glued to an inner surface of the container. The glue can sometimes become detached from the inner surface of the container, which makes the fabric come loose and exposes the inner surface of the container to the user. When this occurs, the container with the flocculent applied thereto is not aesthetically pleasing to most users.

A need exists for a process of applying flocculent to plastic materials that will perform well for extended periods of time and is economical to manufacture. It would be advantageous if the process could be used on make up applicators and the like.

SUMMARY OF THE INVENTION

A method of covering a polyolefin surface with flocculent includes applying a polyolefin-bondable adhesive to at least a portion of a polyolefin surface located on a structure. An epoxy bond material is then applied to the portion of the structure. Then, a flocculent is applied to the portion of the structure.

The method can include that the polyolefin surface of the structure is a polyolefin material selected from a group consisting of polyethylene and polypropylene. The method can also include that the polyolefin-bondable adhesive applied to the portion of the structure is allowed to dry for a predetermined amount of time. The predetermined amount of time is generally about 20 to about 30 minutes.

The method can also include that the polyolefin-bondable adhesive is applied by submerging the portion of a structure into a supply of the polyolefin-bondable adhesive, and the epoxy bond material is applied by submerging the portion of the structure into a supply of the epoxy bond material. Moreover, the submerged portion of the structure is removed from the polyolefin-bondable adhesive before submerging in the epoxy bond material. Furthermore, the method can also include that the polyolefin-bondable adhesive is allowed to dry for a predetermined amount of time before submerging the portion of the structure into the epoxy bond material. The method can also include that the flocculent is applied before the epoxy bond material dries.

The structure in the method can be a cosmetic applicator having a base and a core extending therefrom. The polyolefin-bondable adhesive and the epoxy bond material applied to the portion of the structure are applied to the applicator core. The structure in the method can also be a container. The polyolefin-bondable adhesive and the epoxy bond material applied to the portion of the structure are applied to an inner surface of the container.

The present invention also includes an apparatus including a structure having a polyolefin surface selected from a group consisting of polyethylene and polypropylene. The apparatus includes a layer polyolefin-bondable adhesive overlying and abuttingly contacting a portion of the polyolefin surface of the structure. A layer of epoxy bond material overlies and abuttingly contacts the layer of polyolefin-bondable adhesive. A flocculent overlies and abuttingly contacts the layer of epoxy bond material.

The structure of the apparatus can be a cosmetic applicator that has an applicator base and an applicator core. The polyolefin surface of the structure is located on at least a portion of the applicator core. The apparatus can further include a tubular member carrying a fluid connected to the applicator base opposite the applicator core. Moreover, the apparatus can also include a passageway extending through the applicator base and the applicator core. The passageway is adapted to communicate the fluid from the tubular member to the flocculent.

The structure of the apparatus can also be a container. The polyolefin surface of the structure is located on at least a portion of an interior surface of the container.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

FIG. 1 is a simplified block flow diagram describing the method of applying flocculent to a polyolefin material in accordance with a first embodiment of the present invention.

FIG. 2 is a cross-sectional view of a polyolefin material having flocculent applied thereto in accordance with the second embodiment of the present invention.

FIG. 3 is a cross-sectional view of a dispenser constructed in accordance with the second embodiment of the present invention.

DETAILED DESCRIPTION OF THE PREFERRED EMBODIMENT

Figure 4:
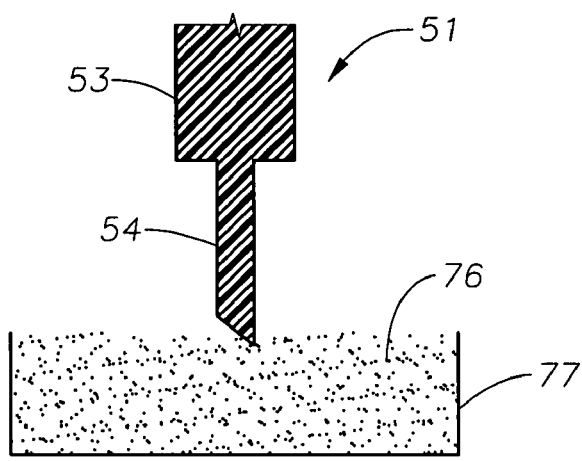
FIG. 4 is a schematic view of the tip core of the applicator of FIG. 3, shown being inserted into a tray of polyolefin-bondable material, but prior to placing flocculent on the tip, in accordance with an embodiment of the present invention.

The present invention advantageously provides a process for applying flocculent 10 to a plastic material 12, such as polyolefins like polyethylene and polypropylene, as described in FIG. 1 and illustrated in FIG. 2. In this process, the plastic material 12 is submerged, or dipped, in a polyolefin-bondable adhesive 14 (block 20). If plastic material 12 is incapable of being submerged or dipped, the adhesive 14 can be applied by other methods known to those skilled in the art of adhesives, such as coating. Polyolefin-bondable adhesive 14, as used herein, is understood to be an adhesive material that is capable of forming a bond with a polyolefin material so that the polyolefin-bondable adhesive adheres to the polyolefin material. An example polyolefin-bondable adhesive 14 suitable for the present invention is manufactured by Toyo Kasei Kogyo Co. LTD and is commercially available as Hardlen 35-A. Other suitable adhesives that are capable of bonding to polyolefins will be known to those skilled in the art and are to be considered within the scope of the present invention.

Plastic material 12 is then removed from the polyolefin-bondable adhesive 14 (block 25) and allowed to dry for a specified time period (block 30). The specified time period is preferably in a range of about twenty to about thirty minutes. Once plastic material 12 covered with adhesive 14 applied thereon is dried, plastic material 12 is then submerged into an epoxy bond, or adhesive, material 16 (block 35). Various types of epoxy bond materials such as thermosetting resins capable of forming tight cross-linked polymer structures can be used and are to be considered within the scope of the present invention. An exemplary epoxy bond material 16 is manufactured by EPCNS Chemicals Industrial and is commercially available as AR-16 (A+B).

Plastic material 12 is removed from the epoxy bond material 16 (block 40) and then flocculent 10 is applied to plastic material 12 (block 45) that has the wet epoxy bond material 16 applied thereto, preferably so that flocculent 10 overlies and abuttingly contacts the epoxy bond material 16.

Polyolefin-bondable adhesive 14 and the epoxy bond material 16 work together so that flocculent 10 does not fall out, nor does flocculent 10 change colors. Polyolefin-bondable adhesive 14 bonds to the plastic material 12 and acts like a surface preparation that enables an outer surface of plastic material 12 to bond with epoxy bond material 16, which then bonds to flocculent 10. The result is a multi-layer coating on plastic material 12, as shown in FIG. 2. Flocculent 10 overlies and abuttingly contacts a layer of epoxy bond material 16, which overlies and abuttingly contacts a layer of polyolefin-bondable adhesive 14. Polyolefin-bondable adhesive 14 then overlies and abuttingly contacts plastic material 12.

Figure 7:
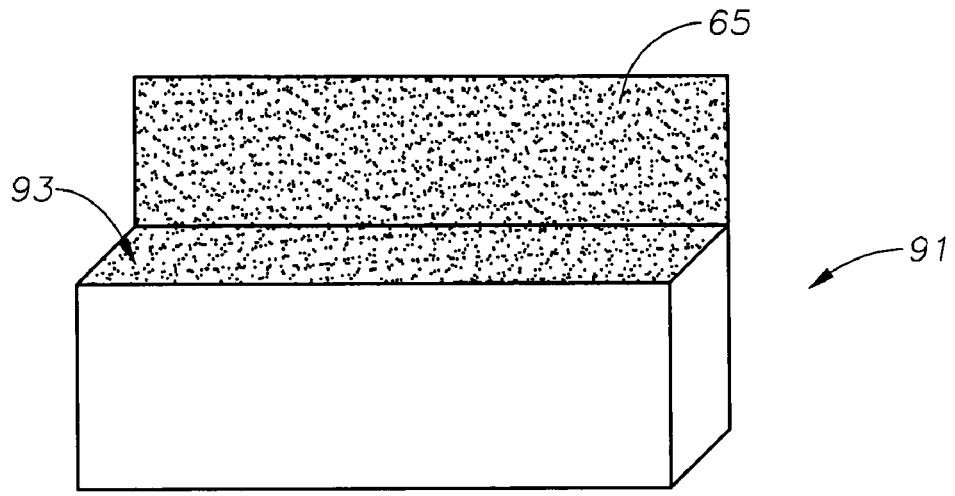
FIG. 7 is a perspective view of a container having an inner surface with flocculent applied thereto in accordance with an embodiment of the present invention.
Figure 8:
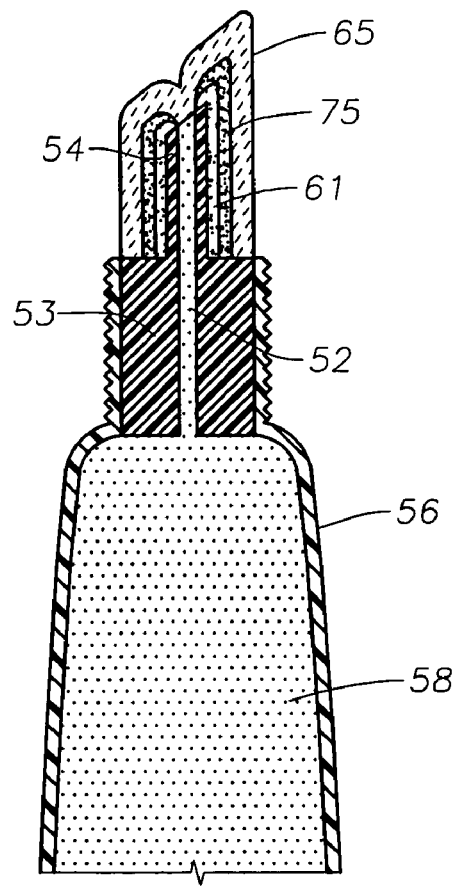
FIG. 8 is a cross-sectional view of an alternative embodiment of the dispenser shown in FIG. 3, and constructed in accordance with the second embodiment of the present invention.

Along with the method embodiments, the present invention also advantageously provides a cosmetic applicator 51 with flocculent 65 applied thereto in accordance with the method embodiments of the present invention, as shown in FIGS. 3 and 8. Also provided is a container 83 having flocculent 65 applied thereto in accordance with the method embodiments of the present invention, as shown in FIG. 7.

Referring to FIG. 3, applicator 51 is particularly used for applying cosmetics in the form of a viscous mass of material. Applicator 51, in this example, has a substantially cylindrical shape with a base 53 and a tip 55. Applicator 51 can have a variety of shapes, such with an oval cross-sectional shape. Suitable shapes will be known to those of ordinary skill in the art of brushes and are to be considered within the scope of the present invention. Base 53 preferably is a cylindrical portion of applicator 51 that can have a variety of shapes. Tip 55 extends upward from base 53.

Tip 55 in this embodiment is cylindrical and of slightly larger diameter than base 53. Tip 55 has an applicator end 57 that is in a plane that can be inclined relative to the axis of base 53. Tip 55 could be shapes other than cylindrical, such as spherical or partially spherical. The inclination of applicator end 57 could be at various angles. A portion of base 53, or a tip core 54, extends vertically through tip 55, as shown in FIG. 3.

Base 53 of applicator 51 can be made by a molding process such as compression molding of a material that is uniform throughout. Preferably the material is made of a polyolefin, such as polypropylene or polyethylene.

In this invention, tip 55 preferably contains a flocculent layer 65, an epoxy bond material layer 75, and a polyolefin-bondable adhesive layer 61 substantially covering and surrounding tip core 54. Polyolefin-bondable layer 61 overlies and abuttingly contacts tip core 54. Epoxy bond layer 75 overlies and abuttingly contacts polyolefin-bondable layer 61. Flocculent layer 65 overlies and abuttingly contacts epoxy bond layer 75.

Figure 5:
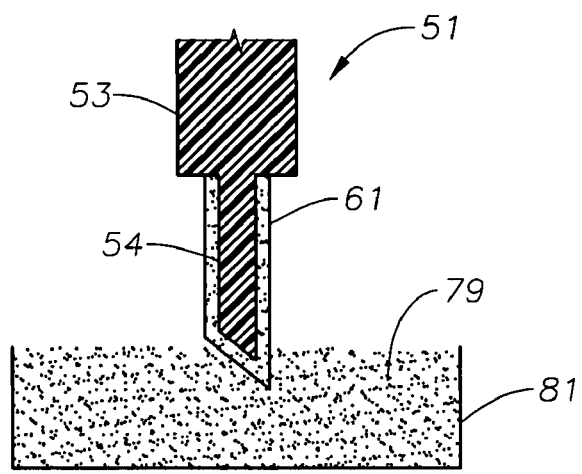
FIG. 5 is a schematic view of the tip core of the applicator of FIG. 3 with the tip core having a layer of polyolefin-bondable material and being inserted into a tray of an epoxy bond material, prior to placing flocculent on the tip core, in accordance with an embodiment of the present invention.
Figure 6:
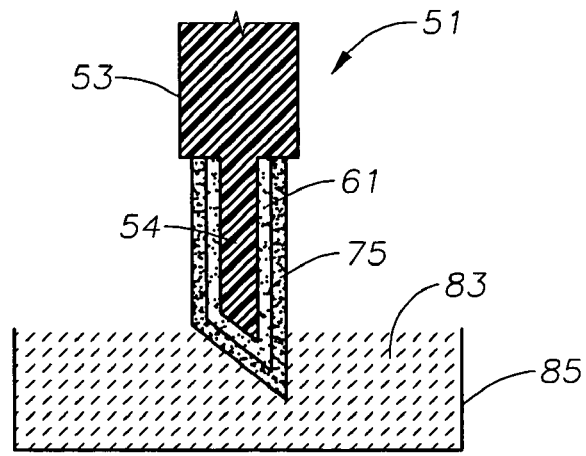
FIG. 6 is a schematic view of the tip core of the applicator of FIG. 3 with the tip core having layers of polyolefin-bondable material and epoxy bond material and being inserted into a tray of flocculent material in accordance with an embodiment of the present invention.

To create the layers of material covering tip core 54, tip core 54 is first dipped in polyolefin-bondable adhesive 76 contained within a tray 77, as shown in FIG. 4. Polyolefin-bondable adhesive 14 is then allowed to dry for a specified time period, preferably about 20 to about 30 minutes, to form polyolefin-bondable adhesive layer 61. Tip core 54 with polyolefin-bondable adhesive layer 61 is then dipped in epoxy bond material 79 contained within a tray 81 to form epoxy bond material layer 75, as shown in FIG. 5. Tip core 54 with polyolefin-bondable adhesive layer 61 and epoxy bond material layer 75 is then dipped in flocculent 83 contained within a tray 85 to form flocculent layer 65, as shown in FIG. 6. The result is that flocculent 83 adheres to the epoxy bond material 79, which adheres to the polyolefin-bondable adhesive 76, which adheres to the tip core 54 to form applicator 51.

Flocculent layer 65 preferably substantially covers tip core 54. Flocculent layer 65 is a conventional material made up of a plurality of particles of a polymer. The polymer could be a variety of materials, such as ABS plastic, Nylon, polyethylene or polypropylene. Once adhered to tip 59, the layers of material create a cushion layer similar to a sponge.

In addition to cosmetic applicator 51, the present invention also advantageously provides a container 91 having an inner surface 93 with flocculent 65 applied to inner surface 93, as shown in FIG. 7. Inner surface 93 is coated with polyolefin-bondable material 61 and then allowed to dry for a specified time period, preferably between about twenty to thirty minutes. Inner surface 93 is then coated with epoxy bond material 75 and then flocculent 65 is applied thereto as previously described.

Referring to FIG. 8, cosmetic applicator 51 can comprise a base 53 and tip core 54 with a passageway 52 extending axially therethrough. Similar to the cosmetic applicator shown in FIG. 3, base 53 preferably includes flocculent layer 65, epoxy bond material layer 75, and polyolefin-bondable adhesive layer 61 substantially covering and surrounding tip core 54. Flocculent, epoxy bond material, and polyolefin-bondable adhesive layers 65, 75, 61 are preferably applied to tip core 54 in the same manner as illustrated and described for FIGS. 4-6.

Base 53 connects to a tubular container 56 so that tip 55 is in fluid communication with the interior of tubular container 56 through passageway 52. Tubular container 56 preferably has a closed end (not shown) located axially opposite base 53. A fluid 58 is carried within tubular container 56 for dispensing to flocculent 65 through passageway 52, typically caused by pressing the inward on the outer sides of tubular container 56. As will be readily appreciated by those skilled in the art, fluid 58 can be selected from numerous fluids for dispensing. For example, fluid 58 can be a lip gloss or lip balm for dispensing and application with cosmetic applicator 51.

As an advantage of the present invention, make up applicators with flocculent applied thereto in accordance with the present invention are much more economical to manufacture. Another advantage of the present invention is that the flocculent does not change colors when applied according to the methods described herein. Cosmetic brushes that look dingy or dirty are not aesthetically pleasing and will deter consumers from purchasing the cosmetic brush, if the brush does not look clear and clean.

As another advantage of the present invention, flocculent can be applied to a non-bondable surface, such as the inside of a jewelry box, without the need of gluing a separate piece of fabric having flocculent on it to the non-bondable surface. The resulting cushioned surface is more durable than fabric with flocculent applied on it being glued to the non-bondable surface.

That claimed is:

1. A method of covering a polyolefin surface of a cosmetic applicator with flocculent, comprising:
   (a) applying a polyolefin-bondable adhesive to at least a portion of the polyolefin surface located on the cosmetic applicator; then
   (b) allowing the polyolefin-bondable adhesive applied to at least the portion of the structure to dry to form a surface preparation layer; then
   (c) applying an epoxy bond material to the surface preparation layer to create an epoxy layer on the surface preparation layer; and then
   (d) applying and bonding a flocculent to the epoxy layer.

2. The method of claim 1, wherein the polyolefin-bondable adhesive is allowed to dry for about 20-30 minutes.

3. The method of claim 1, wherein the polyolefin-bondable adhesive is applied in step (a) by submerging said at least a portion of the cosmetic applicator into a supply of the polyolefin-bondable adhesive, and the epoxy bond material is applied in step (c) by submerging the surface preparation layer into a supply of the epoxy bond material.

4. The method of claim 1, wherein the flocculent is applied in step (d) before the epoxy bond material dries.

5. The method of claim 1, wherein the cosmetic applicator has a base and a core extending therefrom, and the polyolefin-bondable adhesive and the epoxy bond material applied to said at least a portion in steps (a) and (c) are applied to the applicator core.

6. The method of claim 1, wherein the polyolefin surface of the cosmetic applicator is a polyolefin material selected from the group consisting of polyethylene and polypropylene.

7. A method of covering a polyolefin surface located on a cosmetic applicator with flocculent, comprising:
   (c) submerging at least a portion of the polyolefin surface located on a cosmetic applicator in a polyolefin-bondable adhesive; then
   (d) allowing the polyolefin-bondable adhesive on the polyolefin surface of the cosmetic applicator to dry to form a surface preparation layer; then
   (c) submerging the surface preparation layer in an epoxy bond material to form an epoxy layer on the surface preparation layer; and then
   (d) submerging the epoxy layer in a flocculent.

8. The method of claim 7, wherein the cosmetic applicator comprises a base and a core extending therefrom, the polyolefin surface being located on at least the applicator core, and at least a portion of the applicator core is submerged in the polyolefin-bondable adhesive and the epoxy bond material in steps (a) and (c).

* * * * *